Jan. 26 1926.　　　　　　　　　　　　　　　　1,571,130
J. M. LYNN
RODENT TRAP
Filed March 31, 1925　　　3 Sheets-Sheet 1
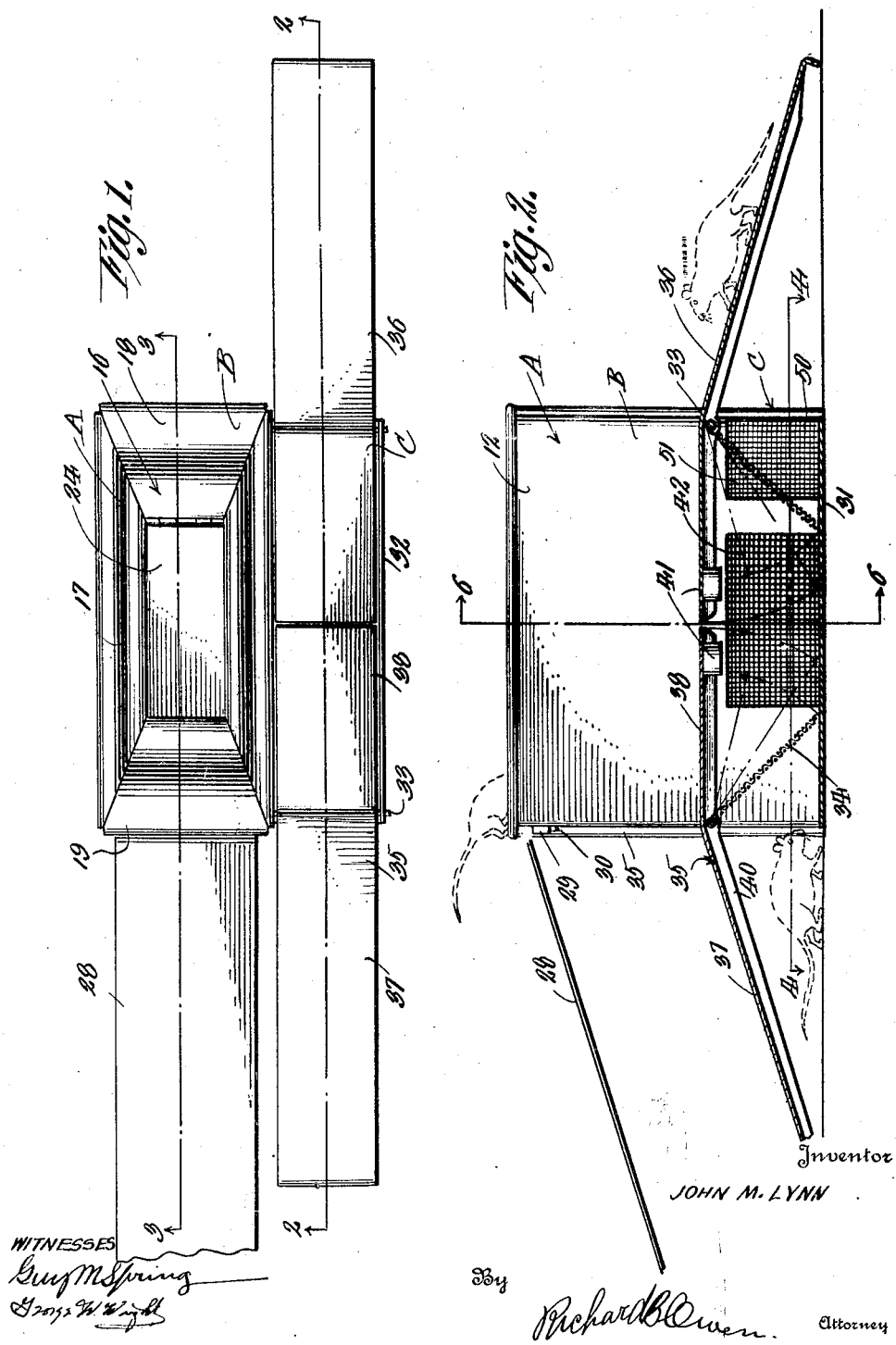
Inventor
JOHN M. LYNN Jan. 26, 1926.
J. M. LYNN
1,571,130
RODENT TRAP
Filed March 31, 1925    3 Sheets-Sheet 2
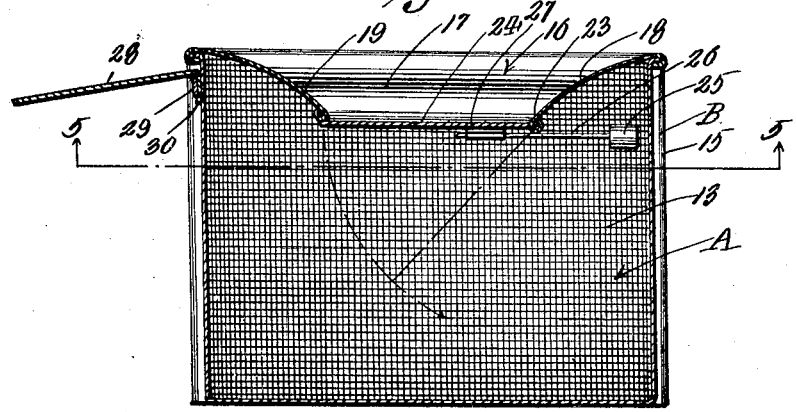
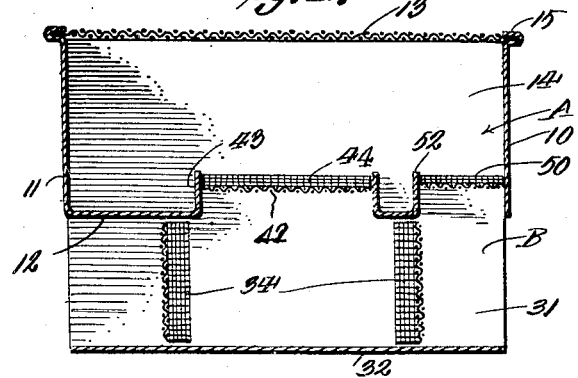
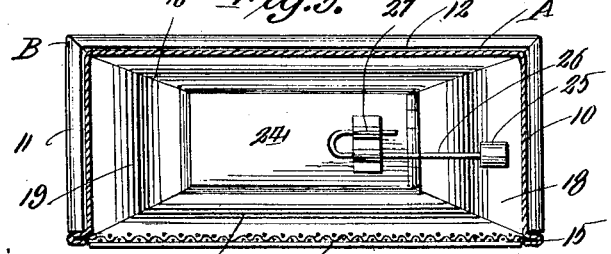
WITNESSES
Inventor
JOHN M. LYNN
By Richard B. Owen
Attorney Jan. 26, 1926.
J. M. LYNN
1,571,130
RODENT TRAP
Filed March 31, 1925    3 Sheets-Sheet 3
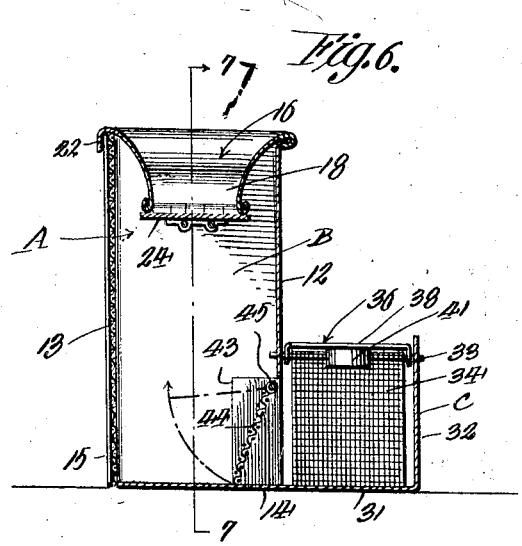
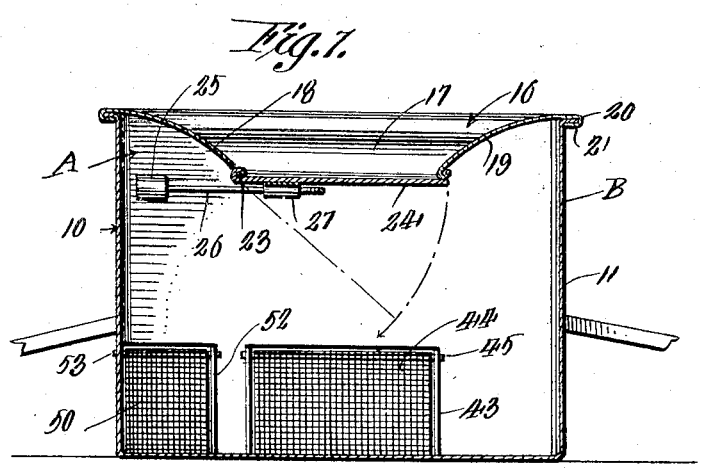
WITNESSES
Inventor
JOHN M. LYNN
By Richard B. Owen, Attorney Patented Jan. 26, 1926.

1,571,130

UNITED STATES PATENT OFFICE.

JOHN M. LYNN, OF ELKHART, TEXAS.

RODENT TRAP.

Application filed March 31, 1925. Serial No. 19,680.

*To all whom it may concern:*

Be it known that I, JOHN M. LYNN, a citizen of the United States, residing at Elkhart, in the county of Anderson and State of Texas, have invented certain new and useful Improvements in Rodent Traps, of which the following is a specification.

This invention appertains to a novel device for catching small animals and more particularly to a rodent trap of the self set and ever set type.

One of the salient features of the present invention is to provide a novel trap, in which a number of different means are provided for catching the rodents, so as to insure the trapping of the animals under all conditions.

Another object of the invention is the provision of a single trap having a series of different trapping devices arranged in different planes, the trapping devices permitting all of the animals caught to enter a single retaining body.

A further object of the invention is the provision of a novel rodent trap embodying a main chamber having a trap door at the upper end thereof disposed at a relatively great distance from the bottom of the chamber with means for permitting easy access to be had to the trap door by the rodents and means including combined runways and trap doors arranged laterally of the body carried by a supplemental compartment and inclined doors pivotally carried by the pivots of the combined trap doors and runways to permit the entrance of the rodents below the combined trap doors and runways into the auxiliary compartments or body, said auxiliary compartment or body having a one-way entrance for communication with the main body.

A still further object of the invention is to provide an improved rodent trap of the self-set and ever set type, which will be durable and efficient in use, one that will be simple and easy to manufacture, and one which can be placed upon the market at a small cost.

With these and other objects in view, the invention consists in the novel construction, arrangement and formation of parts, as will be hereinafter more specifically described, claimed and illustrated in the accompanying drawings, in which drawings:

Figure 1 is a top plan view of the improved trap,

Figure 2 is a longitudinal section taken on the line 2—2 of Figure 1 looking in the direction of the arrows, through the auxiliary body or compartment, Figure 3 is a longitudinal section taken on the line 3—3 of Figure 1 looking in the direction of the arrows, showing the main body of the trap, Figure 4 is a horizontal section through the complete trap taken on the line 4—4 of Figure 2 looking in the direction of the arrows, Figure 5 is a horizontal section through the main body of the trap taken on the line 5—5 of Figure 3 looking in the direction of the arrows, Figure 6 is a transverse section through the complete trap taken on the line 6—6 of Figure 2 looking in the direction of the arrows, Figure 7 is a longitudinal section through the main part of the trap taken on the line 7—7 of Figure 6 looking in the direction of the arrows.

Referring to the drawings in detail, wherein similar reference characters designate corresponding parts throughout the several views, the letter A generally indicates the improved trap, which comprises the main body portion B and the auxiliary body portion C.

While I prefer to construct the trap for sanitary reasons from sheet metal and closely woven wire mesh, it is to be understood that the trap can be made from any other preferred material.

The main body of the trap B is formed relatively high, for a purpose, which will be hereinafter more fully described, and the same embodies end walls 10 and 11 and side walls 12 and 13, and a bottom wall 14. While the trap can be made of a knock down structure to facilitate shipping and the like, I have shown the end walls 10 and 11 formed directly on the side wall 12 and these walls can be made of a single piece of metal. The other side wall 13 is constructed of closely woven wire mesh possessing the necessary tensile strength and the edges of the walls 10 and 11 are bent to provide guideways 15 for slidably receiving the said wall 13. By this construction the complete side wall 13 can be removed from the body of the trap when it is desired to remove the caught rodents therefrom. This wall can be maintained in its normal position in any preferred way, but it can be seen that when the trap is laid on a support, this wall will be naturally held in its normal position. The body B is provided with a novel top structure 16 which is so formed as to provide a substantially funnel shaped construction leading into the interior of the body. Thus this top 16 includes inwardly directed arcuate side walls 17 and arcuate inwardly directed end walls 18 and 19. Any preferred means can be utilized for associating this top 17 with the body but in accordance with the invention, I prefer to provide the end walls 19 and one side wall 17 with U-shaped flanges 20 for receiving right angular flanges 21 formed on the upper edges of the end walls 10 and 11 and the side wall 12 of the body. The other wall 17 of the top 16 is provided with a depending flange 22 for overlying the top of the foraminous side wall 13 of the body.

The end wall 18 of the top 16 can be rolled to provide hinge barrels for receiving a pivot pin 23 and a trap door 24 is provided for normally closing the said top and one edge of the trap door is rolled to provide hinge barrels for engaging the pivot pin 24. In order to normally hold the trap door 24 in closed position I provide a weight 25 which is mounted upon a shank 26 carried by sleeves 27 arranged on the lower surface of the trap door 24 adjacent to the pivot pin 23. If desired the shank 26 can be slidably mounted in the sleeves 27 in order to adjust the position of the weight 25 relative to the pivot pin in order to maintain the closure in its closed position with the desired amount of pressure.

A metal runway 28 is carried by the end wall 10 and this runway is arranged in an inclined plane having its lower end resting upon the ground or other support and its upper end connected with said end wall in any preferred manner. If desired the said end wall can be provided with a strap or loop 29 for receiving a depending tongue 30 formed on the upper end of the inclined runway. This permits the detachable connection of the runway with the body of the trap. Any desired kind of bait can be placed on or above the trap door 25 and when the animals run up the runway on to the top 16 and then on to the top 24 it is obvious that the weight of the animals will overcome the action of the weight 25 and precipitate the animals into the body. As heretofore stated the body B is formed relatively high, so that the animals trapped will not be able to reach the trap door 24.

The auxiliary body C is arranged laterally of the side wall 12 of the main body B and this auxiliary body includes a bottom wall 31 which is preferably formed integral with the bottom wall 14 of the main body B and a side wall 32 which is also preferably formed on the side edge of the bottom wall 31. This wall 32 terminates an appreciable distance below the upper edge of the main body B as can be readily seen by referring to Figures 2 and 6 of the drawings. The side wall 32 and the side wall 12 support pivot shafts 33 adjacent to the ends of auxiliary body C and these shafts rockably support swinging doors 34. These swinging doors 34 are preferably formed of closely woven wire and the upper edges thereof are coiled to provide hinge barrels for receiving the said pivot shafts 33. The swinging doors 34 are of a greater length than the height of the auxiliary body and thus these doors are normally arranged in inclined planes as shown in Figure 2 of the drawings. If preferred the lower edges of the swinging doors are weighted so as to insure the same to normally maintain their closed position. It is obvious the same will normally tend to swing to lowered position by their own weight. Thus if a suitable bait is placed within the auxiliary body the rodents will endeavor to gain access to the interior of the body which may be done by simply pressing against the doors 34. After the rodents have entered the auxiliary body, the doors will be closed by their weight and the escape of the animals will be prevented.

I provide another novel means for catching the animals which includes a pair of combined runways and trap doors 35 and 36. Each of the combined runways and trap doors 35 and 36 include a runway portion 37 and a trap door portion 38 which are arranged at an angle to one another. These combined trap doors and runways are rockably mounted upon the shafts 33 at their angles. The runway portions 37 are of a greater length than the trap door portions 38 and these trap door portions are so arranged as to extend into the auxiliary body substantially to the transverse center thereof. In order to brace the said combined runways and trap doors 35 and 36 the side edges thereof are provided with depending marginal flanges 40.

Counter-balancing weights 41 are preferably carried by the lower faces of the trap door portions 38 of the combined trap doors and runways 35 and 36 and thus when the rodent steps upon the trap door portion, it is obvious that the said combined runways and trap door will rock on the shafts 33 and precipitate the animal into the auxiliary compartment. Any desired kind of bait can be placed above these members substantially at the transverse center of the trap.

In order to permit the animals to enter the body portion B of the trap, the side wall 12 of the body is provided with an entrance 42 and the side edges of said entrance are provided with inwardly directed reinforcing flanges 43. An inwardly opening door 44 preferably formed from wire screen is arranged to normally cover the said entrance and the upper edge of the door is rolled to provide a hinge barrel receiving a rock shaft 45 carried by the upper ends of the flanges 43. This door 44 is of a greater height than the distance from the rock shaft 45 to the bottom wall 14 and thus this door is normally arranged at an angle to the horizontal as can be readily seen by referring to Figure 6 of the drawings. When the rodent is caught in the auxiliary body and endeavors to escape therefrom, it is evident that it will push against door 44 open the same and thus permit the animal to walk into the main body B. After the rodents have gained access to the main body they are prevented from going back into the auxiliary body C due to the arrangement of said door 44. In this manner rodents are all housed within the main body.

I also prefer to provide means for catching rodents at the lower end of the main body B of the trap and this means embodies a swinging door 50 preferably formed of closely woven wire screen arranged at one side of the door 34. An opening 51 is cut in the side wall 12 on the main body B and one wall of the opening is provided with inwardly directed flange 52. The extreme upper edge of this door 50 is rolled to provide a hinge barrel which receives a hinge pin 53, passed through the flange 52 and the end wall 10. This door 50 has a greater height than the distance of the upper edge of the opening and the bottom wall 14 and the door opens inwardly into the body and is arranged directly under the combined runway and trap door 36. Thus it is obvious that a rodent entering under the combined runway and trap door 36 can either gain access direct to the body B through door 50 or into the auxiliary compartment C through the door 34. It is obvious from the foregoing that I have provided a rodent trap of exceptionally simple and durable construction, in which a plurality of means has been provided for trapping the rodents.

The trap of course may vary in size so as to either trap mice or rats, but it is to be understood that the trap can be used for catching other kinds of animals.

Changes in details may be made without departing from the spirit or the scope of this invention, but

What I claim as new is:

1. A rodent trap comprising a main body, a laterally extending auxiliary body of a less height than the main body, an inwardly opening door carried by the main body for permitting communication to be had between the auxiliary body and the main body, and normally closed pivoted trap doors carried by the upper ends of the main and auxiliary bodies.

2. A rodent trap comprising a main body, a laterally extending auxiliary body associated with the main body, an inwardly opening normally closed door carried by the main body for permitting communication to be had between the auxiliary body and the main body, a normally closed trap door pivotally carried by the upper end of the main body, an inclined runway leading from the ground to the top of the main body, rockably mounted trap doors normally held in a closed position carried by the upper end of the auxiliary body, the auxiliary body being of a less height than the main body, and inwardly opening swinging doors carried by the auxiliary body disposed below the first mentioned doors carried thereby.

3. A rodent trap comprising a main body, an auxiliary body arranged laterally on the main body and of a less height, an inwardly opening door carried by the main body for permitting communication to be had from the auxiliary body to the main body, and a pivoted trap door carried by the upper end of the main body, means normally holding the door in a closed position, an inclined runway extending to the ground from the upper end of the main body, trap doors carried by the upper end of the auxiliary body, means normally maintaining the doors in a closed position, inwardly opening swinging doors carried by the ends of the auxiliary body arranged below the first mentioned trap doors carried thereby, and an inwardly opening trap door carried by the upper end of the body and outward of the inwardly opening door carried by one end of the auxiliary body.

4. A rodent trap comprising a main body including end walls, a connecting side wall, and a bottom wall extending laterally beyond the side wall, the end walls remote from the mentioned side wall provided with U-shaped guides, a foraminous side wall slidably associated with said guides to permit entrance to be had to the main body, a top associated with the upper end of the main body including inwardly directed walls extending into the main body, a normally closed pivoted trap door associated with the top and arranged at the inner end of said inclined walls, a runway leading from the ground to said top, an auxiliary body arranged laterally of the main body including a side wall formed on the extension of said bottom wall, inwardly opening pivoted trap doors carried by the ends of the auxiliary body forming closures therefor, inwardly opening pivoted trap doors carried by the upper end of the auxiliary body forming closures for the upper end thereof, means normally maintaining said last mentioned trap doors in closed position, and an inwardly opening normally closed door carried by the main body for permitting communication to be had from the auxiliary body into said main body.

In testimony whereof I affix my signature.

JOHN M. LYNN.